United States Patent [19]
Rowlette

[11] Patent Number: 5,114,807
[45] Date of Patent: May 19, 1992

[54] LIGHTWEIGHT BIPOLAR STORAGE BATTERY

[75] Inventor: John J. Rowlette, Monrovia, Calif.

[73] Assignee: California Institute of Technology, Pasadena, Calif.

[21] Appl. No.: 516,439

[22] Filed: Apr. 30, 1990

[51] Int. Cl.$^5$ .............................................. H01M 2/20
[52] U.S. Cl. ................................... 429/152; 429/179; 429/210
[58] Field of Search ........................ 429/152, 179, 210

[56] References Cited

U.S. PATENT DOCUMENTS

| | | | |
|---|---|---|---|
| 3,728,158 | 4/1973 | Poe et al. | 429/210 X |
| 4,208,473 | 6/1980 | Bradley | 429/210 X |
| 4,900,643 | 2/1990 | Eskra et al. | 429/210 X |
| 5,002,841 | 3/1991 | Belongia et al. | 429/152 X |

Primary Examiner—Stephen Kalafut
Attorney, Agent, or Firm—Loyal M. Hanson

[57] ABSTRACT

An apparatus [10] is disclosed for a lightweight bipolar battery of the end-plate cell stack design. Current flow through a bipolar cell stack [12] is collected by a pair of copper end-plates [16a,16b] and transferred edgewise out of the battery by a pair of lightweight, low resistance copper terminals [28a,28b]. The copper terminals parallel the surface of a corresponding copper end-plate [16a,16b] to maximize battery throughput. The bipolar cell stack [12], copper end-plates [16a,16b] and copper terminals [28a,28b] are rigidly sandwiched between a pair of nonconductive rigid end-plates [20] having a lightweight fiber honeycomb core which eliminates distortion of individual plates within the bipolar cell stack due to internal pressures. Insulating foam [30] is injected into the fiber honeycomb core to reduce heat transfer into and out of the bipolar cell stack and to maintain uniform cell performance. A sealed battery enclosure [22] exposes a pair of terminal ends [26a,26b] for connection with an external circuit.

22 Claims, 10 Drawing Sheets

LIGHTWEIGHT BIPOLAR STORAGE BATTERY

ORIGIN OF INVENTION

The invention described herein was made in performance of work under a NASA contract and is subject to the provisions of Public Law 96-517 (35 USC 202) in which the Contractor has elected to retain title.

TECHNICAL FIELD

The present invention relates generally to methods and apparatus pertaining to storage batteries and in particular to an improved lightweight, low-profile, sealed, bipolar battery which is capable of producing either high or low voltage.

BACKGROUND ART

Lead-acid storage batteries are widely used in commercial, industrial and military applications. The largest single application of lead-acid storage batteries is for the starting, lighting and ignition (SLI) of automobiles, trucks and buses. These batteries are charged automatically from a generator driven by the engine while it is running, they supply power for the lights while the engine is shutdown and for ignition and cranking when the engine is started. Other applications include SLI for boats and aircraft, the storage of electromotive power for electric vehicles; and the regulation of electric power for industrial generators, a typical non-motive situation.

The conventional lead-acid battery is use today contains a series of lead-acid cells, each including a positive plate containing positive, active, material such as lead dioxide, and a negative plate containing negative, active, material such as sponge lead immersed in an electrolyte solution, typically dilute sulfuric acid. The respective positive and negative plates are connected in parallel, with the power or current output of a cell being determined by the number and size of the plates. The open circuit potential developed between each pair of positive and negative plates is about two volts. Since the plates are connected in parallel, the combined potential for each cell will be also about 2 volts regardless of the number of plates utilized in the cell. One or more cells are then serially connected to provide a battery of desired voltage. Common low voltage batteries are 12 volt batteries having 6 serially connected cells.

The positive and negative plates are usually oriented vertically in a horizontal stacked relationship. As a result of this vertical orientation, electrolyte stratification commonly occurs vertically along the plate surfaces. This results in diminishing battery performance with time. Another problem with conventional lead-acid batteries is their limited lifetime due to shedding of the active materials from the positive and negative plates. Pasted plate lead-acid batteries are by far the most common type of lead-acid battery. Typically, a paste of lead oxide is applied to the surfaces of the positive and negative grids. When a initial electric charge is applied to the plates, the lead oxide paste on the positive grid is oxidized to lead dioxide while the lead oxide on the negative plate is reduced in the cathodic reaction. During continued operation of the lead-acid battery, shedding or flaking of the deposited lead paste occurs. The flakes of material fall down between the vertically oriented plates and accumulate in a well on the battery bottom. After a period of time, sufficient flakes accumulate on the battery bottom to short circuit the negative and positive grids resulting in shortened battery life.

Conventional lead-acid batteries are inherently heavy due to the use of lead in constructing the plates. This is unacceptable in applications where a lightweight battery with a high power density is required, such as for use in aircraft and electric cars. Emphasis in the prior art was placed on producing thinner plates made from lightweight materials used in place of or in combination with lead. Although the thinner, lightweight plates were beneficial in reducing battery weight, they presented structural design problems. Cell structures which were sufficiently strong and rigid to prevent structural failure during normal use were then required.

In my U.S. Pat. No. 4,405,697, entitled "IMPROVED LEAD-ACID BATTERY," the disclosure of which is expressly incorporated herein by reference, a lightweight battery is described which includes a plurality of horizontally oriented, vertically stacked alternating positive and negative monoplates or grids. Tabs are provided extending from two opposite edges of the plates or grids along the total length of the grids on both sides thereof. The negative and positive plates were stacked so that two positive tabs extend from the cell or grid stack on sides adjacent the two negative tabs. The common tabs on each side of the grid stack were welded together in parallel to form four bus bars or plates extending vertically up the cell sides. The bus bars not only greatly reduced the electrical resistance in the battery cell or grid stack, but additionally provided rigidity and strength to the cell structure. Further, the horizontal orientation of the grids prevented the accumulation of flaked lead compounds at the battery bottom, since their downward movement was blocked by the glass mat containing the electrolyte placed between each set of positive and negative plates. Also, stratification of the electrolyte was avoided since the electrolyte was confined and contained within the acid resistant glass mats by capillary action. Oxygen generated within the chamber during discharge was permitted to escape via a single resealable vent. This construction avoided the buckling, warping and unequal gassing which occured in batteries using separate, sealed cells.

In order to increase the available voltage potential of the "IMPROVED LEAD-ACID BATTERY," which is necessary for most applications, it was necessary to serially connect a number of cells together. In my U.S. Pat. No. 4,539,268, entitled "SEALED BIPOLAR MULTI-CELL BATTERY," the disclosure of which is expressly incorporated herein by reference, bipolar plate groupings, secured within the battery stack, were placed between alternating monopolar plates. The positive ends of the bipolar plate groupings were located adjacent the monoplates having negative active material and the negative ends of the bipolar plate groupings were located adjacent monoplates having positive active material. Each bipolar plate grouping included one or more bipolar plates with electrolyte layers between the bipolar plates. The bipolar plates conducted current perpendicular through the plates, resulting in low-resistance serial electrical connections. Bus bars connected to the edges of the monoplates provided structural support and electrical connection with the battery terminals. Varying the number of monopolar and bipolar plates in each grouping afforded a convenient way to customize the voltage potential produced by the battery for the specific application. The number of bipolar plate groupings connected in parallel by the bus bars, and the area of the plate surfaces, determined the discharge current capacity of the battery. Battery manufacturers enjoyed the versatility to easily adapt battery output current and voltage characteristics to a specific application.

For many years, battery manufactures have searched for ways to penetrate new lucrative markets and expand existing markets for their products. One problem for which a solution has been sought is that the state of the art in end-plate cell stack battery designs are still too heavy and bulky for many practical applications. The need to provide pressure and rigidity on the cell stack end-plates to inhibit warping or bowing of individual plates and the need to have very low resistance terminals has made the extensive use of lead preferable, which adds to the weight of the design. Another problem for which a solution has been sought is that the awkward protrusion of battery terminals from the enclosure effectively increases the working volume of the battery and many times prohibits the convenient networking of multiple bipolar storage batteries in parallel or serial arrays. Still another problem is an undesirable tendency for the development of substantial operating temperature differentials between the end cells and the interior cells in the bipolar cell stack. This anisotropic tendency results in non-uniform cell performance and lower power efficiency. Solutions to these problems are necessary for growth of the battery industry.

A high demand for bipolar storage batteries in electric vehicles, portable consumer products, industrial load leveling, and many airborne applications would be extremely desirable to the battery industry. Clearly, the need for lighter weight, lower volume and higher efficiency batteries is essential for growth. For example, though an economical, high performance and environmentally safe electric vehicle has been sought for many years, the current state of the art in bipolar storage batteries has not resulted in a viable consumer product. The next advancement in the state of the art in bipolar storage batteries will stimulate growth in the battery industry through the development of new designs exhibiting improved thermal performance and higher power [and energy] to weight [and volume] efficiencies.

STATEMENT OF THE INVENTION

The present invention is a lightweight bipolar storage battery employing novel geometric design features and lightweight materials which improve the power to weight and energy to weight ratios of the prior art batteries, while minimizing height profile and volume requirements. A rechargeable bipolar cell stack, having positive and negative output ends, generates electrical power along a generally perpendicular main axis. Current is collected and removed from the bipolar cell stack in parallel along a transverse axis which is generally perpendicular to the main axis of the battery. This minimizes the resistivity to current flow through the bipolar cell stack. The bipolar cell stack is rigidly stiffened and thermally insulated along the main axis to prevent bowing of individual bipolar plates and to prevent the ends cells in the stack from operating at a substantially different temperature than the interior cells, enabling uniform cell performance. A sealed enclosure provides access to the electrical current collected and removed from the bipolar cell stack. Novel assembly methods for manufacturing the bipolar storage battery of the present invention are provided.

The various features and advantages of the present invention are apparent in light of the following detailed description taken together with the accompanying drawings.

DETAILED DESCRIPTION OF THE INVENTION

Figure 1:
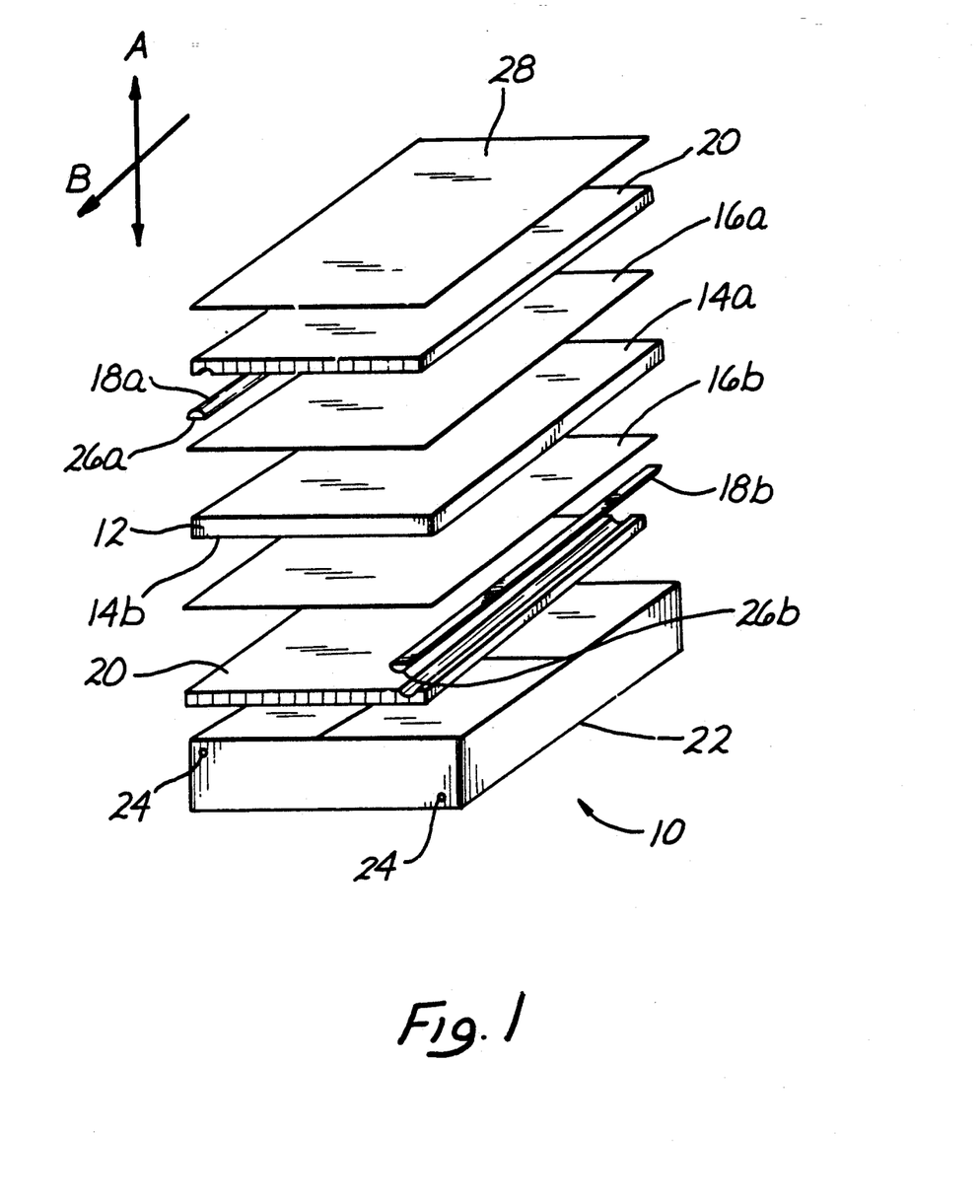
FIG. 1 illustrates an exploded view of a preferred embodiment of the apparatus of the present invention.

FIG. 1 is an exploded view of an apparatus [10] of the present invention, illustrating a centrally disposed stack of bipolar cells [12] having a positive output end-plate[14a] and a negative output end-plate [14b], a first [16a] and a second [16b] current collecting member, a first [18a] and a second [18b] current removing member, a pair of rigid end-plates [20], and a sealed enclosure [22] having a pair of apertures [24] to expose a first current removal end [26a] of the first current removing member [18a] and a second current removal end [26b] of the second current removing member [18b].

Figure 2:
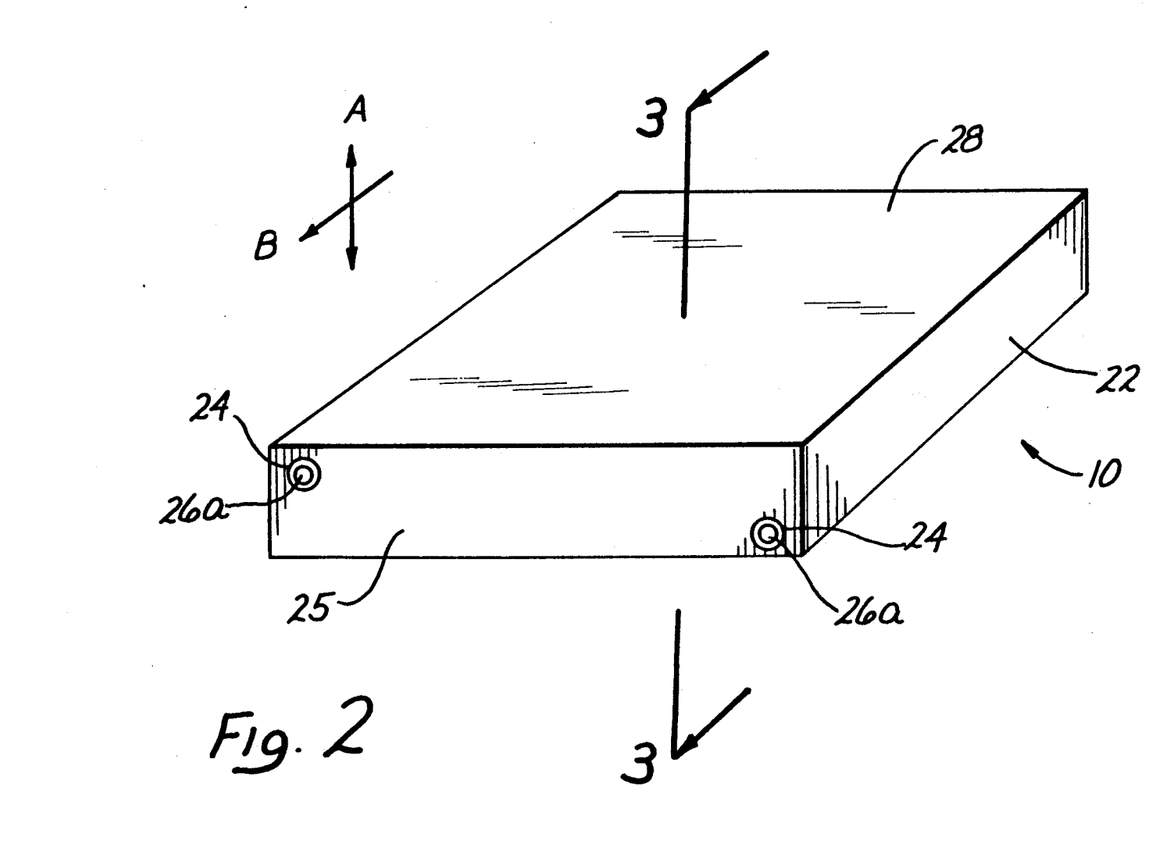
FIG. 2 illustrates an assembled perspective view of the preferred embodiment the apparatus of the present invention shown in FIG. 1.

FIG. 2 illustrates the assembled apparatus [10] in a single chamber sealed enclosure [22] having a top cover [28]. The enclosure [22] provides a strong, lightweight package which has the capability to vent excessive gas pressure built up during discharge of the battery. The preferred enclosure is made of durable, lightweight plastic since weight is an important consideration of the present invention. A pair of apertures [24] are provided in a front panel [25] of the enclosure [22] for external access to a first removal end [26a] of the first current removing member [18a] and a second removal end [26b] of the second current removing member [18b].

Figure 3:
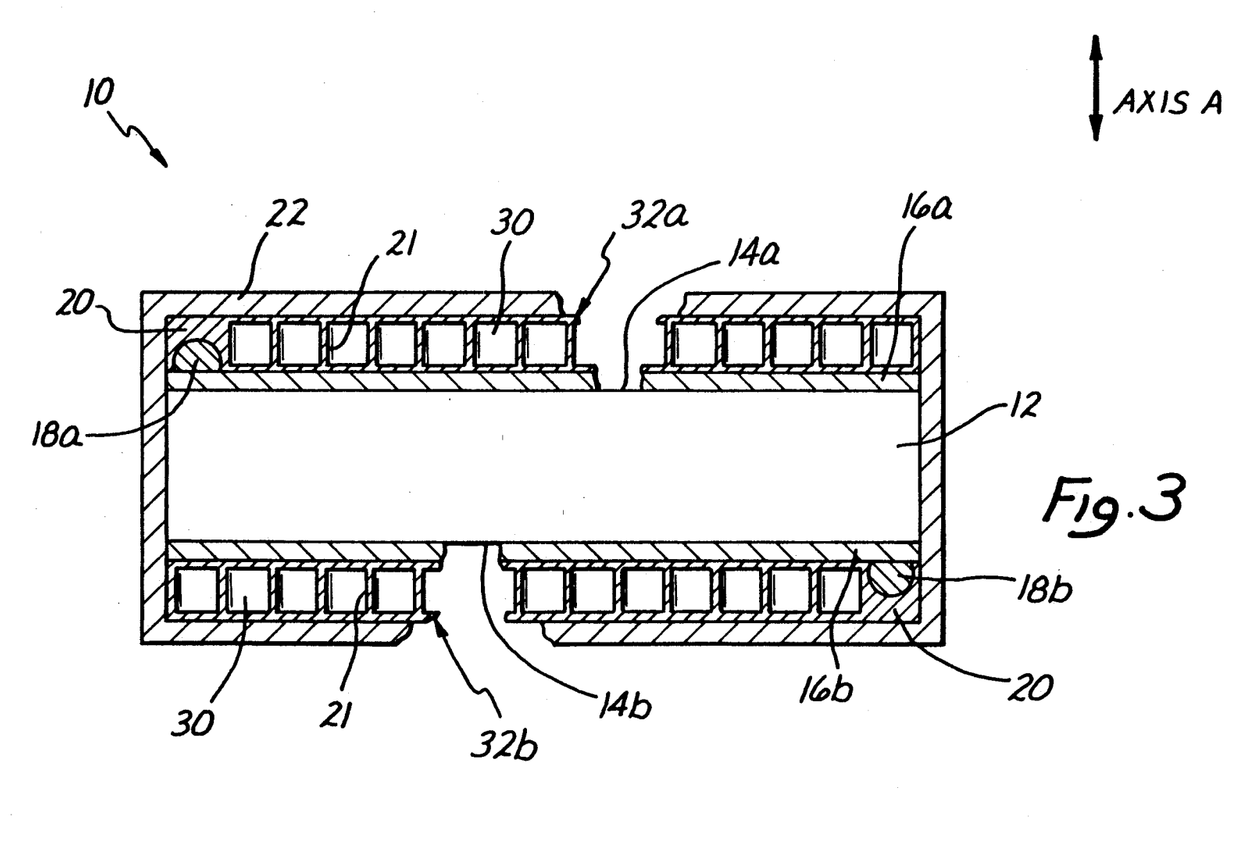
FIG. 3 is a sectional view of the assembled apparatus of the preferred embodiment of the present invention taken along line 3—3 in FIG. 2.

FIG. 3 depicts a sectional view of the assembled apparatus [10] taken along line 3—3 in FIG. 2. A rechargeable bipolar cell stack [12] for generating electrical power is shown, the number of plates within the bipolar cell stack [12] determines the battery voltage and the size of the plates determines the current capacity. Suitable biplates for the cell stack were disclosed in my U.S. Pat. No. 4,539,268, entitled "SEALED BIPOLAR MULTI-CELL BATTERY," the disclosure of which was previously incorporated by reference. A positive output end-plate [14a] is at the positive end of the bipolar output stack and a negative output end-plate [14b] is at the negative end of the bipolar stack. The present invention utilizes a first current collecting end-plate [16a] in parallel electrical communication with the positive output end-plate [14a] and a second current collecting end-plate [16b] in parallel electrical communication with the negative output end-plate [14b]. The current collecting end-plates are preferably lightweight sheets of copper base metal (2 to 5 mil thicknesses are suggested), which exhibit a low resistivity ($10^{-5}$ to $10^{-8}$ ohm-cm$^2$ is typical) to the flow of electrical current. A first current removing member [18a] is disposed in parallel electrical communication with the first current collecting end-plate [16a] and a second current removing member [18b] is disposed in parallel electrical communication with the second current collecting end-plate [16a]. This geometry provides a minimum resistance path for battery current in a transverse axis [B], which is generally perpendicular to the main axis [A], the apparatus [10] being oriented in FIG. 3 such that axis A extends as shown and axis B extends perpendicular to the plane of the sheet of paper on which FIG. 3 appears. Current flowing through the bipolar stack during charge and discharge cycles is therefore very efficiently removed. A preferred current removing member [18a,18b] is made of solid copper tubing, due to its light weight, low resistivity and ready availability. A parallel stacking of the bipolar cell stack [12], the current collecting end-plates [16a,16b], and the current removing members [18a,18b], is sandwiched between a pair of rigid end-plates [20] such that pressure is applied along the main axis [A] of the bipolar cell stack [12]. Warping, buckling, or distorting of the bipolar cell stack [12] resulting from the compression of the separator material typically utilized between the plates in the bipolar cell stack or the internal pressure generated within the battery, which may be as high as 10 psi at 1 g in a sealed lead-acid storage battery, is therefore prevented. A preferred embodiment of the present invention utilizes a non-conductive rigid end-plate [20] having a honeycomb core [21], commonly used in marine and aircraft applications and readily available in rigid graphite fiber panels under the trade name of HEXCEL ®, for example. Equal thicknesses of a rigid graphite fiber honeycomb panel and a solid panel of steel or aluminum, have comparable stiffness along an axis normal to the panel, however the fiber honeycomb panel exhibits a far superior stiffness to weight ratio. In addition to being non-conductive and lightweight, the rigid end-plates [20] must be resistant to the electrochemical environment within the apparatus [10]. Each rigid end-plate [20] also acts as a thermal insulator along the main axis [A] of the apparatus [10], reducing the tendency for the outer cells in the stack to operate at en elevated temperature with respect to the internal cells in the stack, which results in non-uniform cell performance and reduced battery efficiency. Thermally insulating the bipolar cell stack [12] has the effect of dispersing heat generated during charge or discharge of the battery laterally from the sides of the bipolar cell stack [12] since the rigid honeycomb end-plate [20] has a high thermal resistivity. To further improve the thermal resistivity of the rigid honeycomb end-plate [20], a dispersion of insulating foam [30] may be injected into the honeycomb core [21]. The injection of insulating foam [30] creates a most preferred first thermally insulating and stiffening end-plate member [32a] and a second thermally insulating and stiffening end-plate member [32b] which further improves the thermal uniformity between the end cells and the interior cells in the bipolar stack [12]. The rigid end-plates [20] may alternatively be composed of wood or solid foam core paneling in, both of which provide a reasonable combination of stiffness and thermal insulation properties with light weight.

Figure 4A:
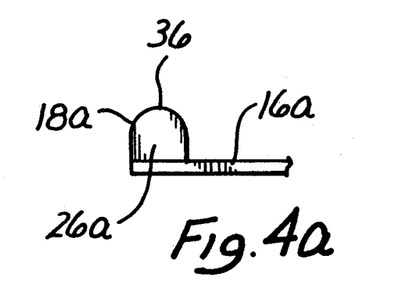
FIGS. 4a-4f are schematic diagrams of several current collecting and removing member shapes.
Figure 4B:
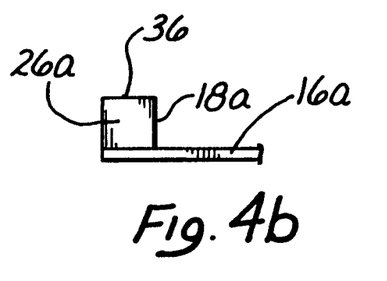
Figure 4C:
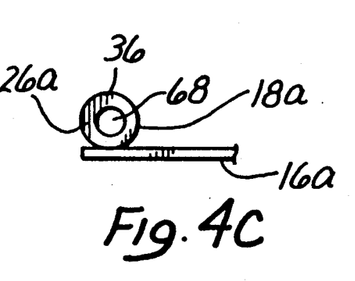
Figure 4D:
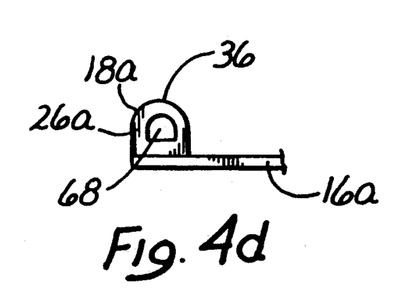
Figure 4E:
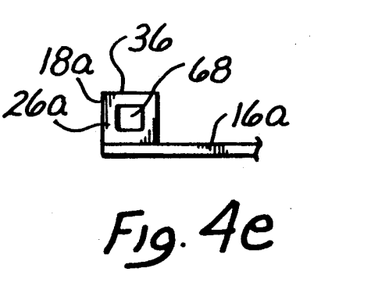
Figure 4F:
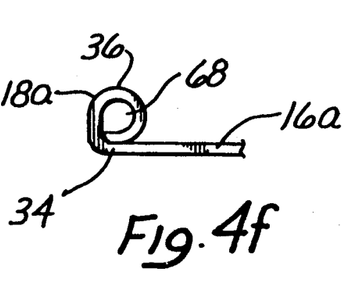

FIGS. 4a-4f illustrate that the shape of the current removing members [18a, 18b] may be any convenient geometry which facilitates a low resistance electrical connection with the respective current collecting end-plate [16a, 16b], i.e., squared, rectangular, polygonal, circular, U-shaped or even triangulated, though circular is most preferred due to the ready availability of pure copper tubing. For example, FIG. 4a illustrates a current removing member [18a] having a rounded perimetrical profile [36] with a flat portion facing the current collection end-plate [16a]. FIG. 4b illustrates a member [18a] having a square perimetrical profile [36]. FIG. 4c illustrates a member [18a] having a cylindrical profile [36] and a hollowed receptacle [68], and FIG. 4d illustrates a member [18a] with rounded profile [36] and hollowed receptacle [68]. FIG. 4e illustrates a square profile [36] with a hollowed receptacle [68], and FIG. 4f illustrates the cylindrical profile of a member [18a] formed integrally with the plate [16a] in one-piece current collecting and removing member [34]. A length of the current removing member [18a, 18b] is disposed in edgewise parallel electrical communication with a corresponding current collecting end-plate [16a, 16b] surface dimension in its entirety. This unique geometry minimizes the electrical resistance between the current collecting end-plate [16a] and the current removing member [18a] by maximizing the electrical contact surface area. Fusion welding, braze welding, brazing, or soldering is recommended for permanently mating the current removing member [18a] with a respective current collecting end-plate [16a], to produce an essentially zero electrical resistance between the current removing member [18a] and a respective current collecting end-plate [16a]. The electrical mating of a current removing member [18a] with a current collecting end-plate [16a] results in a combined current collecting and removing member [34] as shown in FIG. 5.

Figure 5:
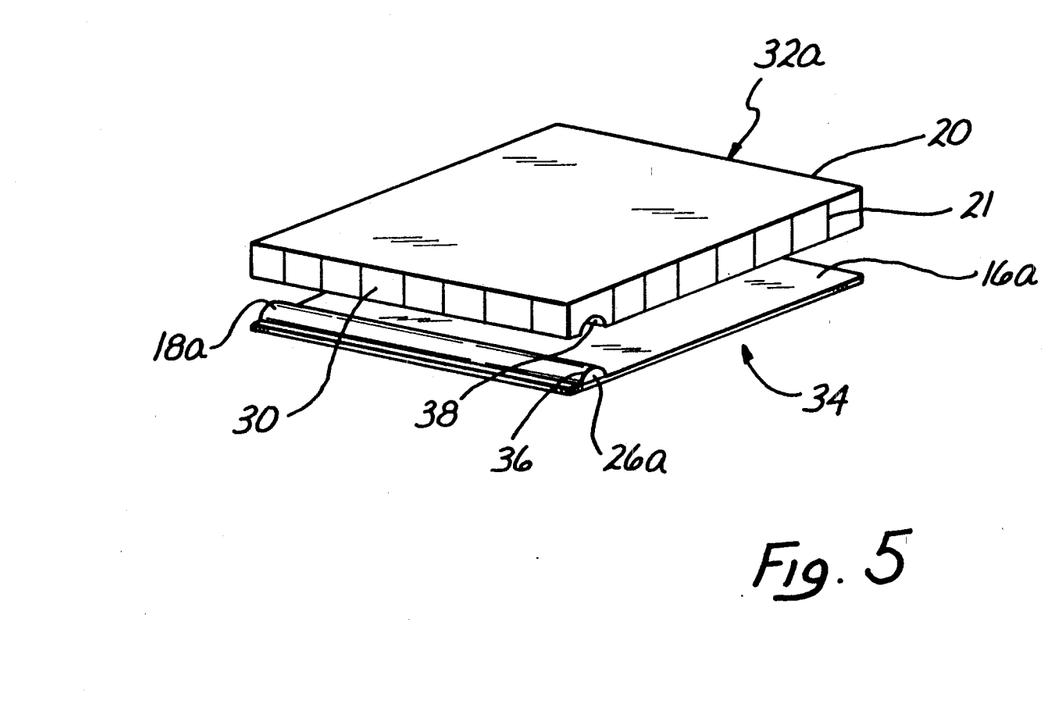
FIG. 5 is a schematic drawing illustrating the relationship between the current collecting, current removing and end-plate stiffening features of the present invention.

FIG. 5 illustrates the preferred mating between a thermally insulating and stiffening end-plate member [32a] and a current collecting and removing member [34]. A perimetrical profile [36] of the first current removing member [18a] is disposed within an elongated indentation [38], or cutout, complementarily fashioned within a thickness of the thermally insulating and stiffening end-plate member [32a]. This geometric feature minimizes the overall height profile and volume requirements of the apparatus [10], and achieves another goal of the present invention.

Figure 6:
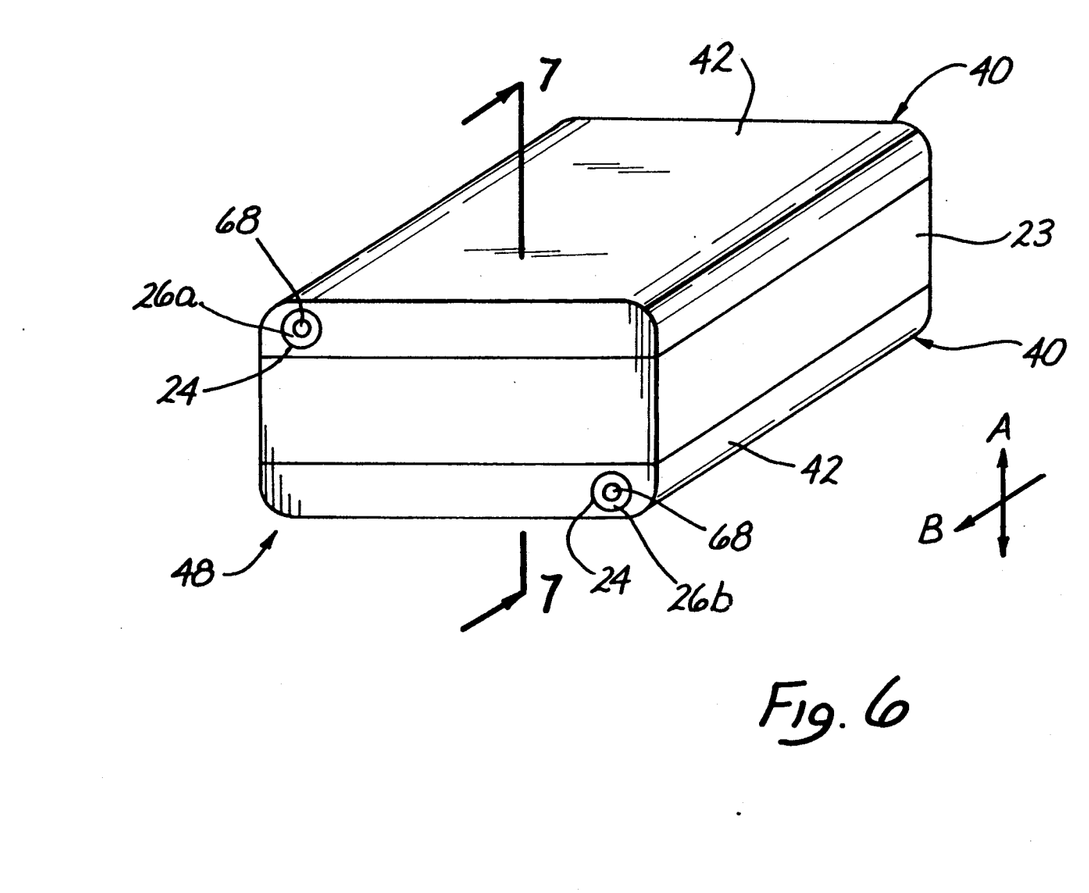
FIG. 6 is a perspective view of a modular embodiment of the present invention.
Figure 7:
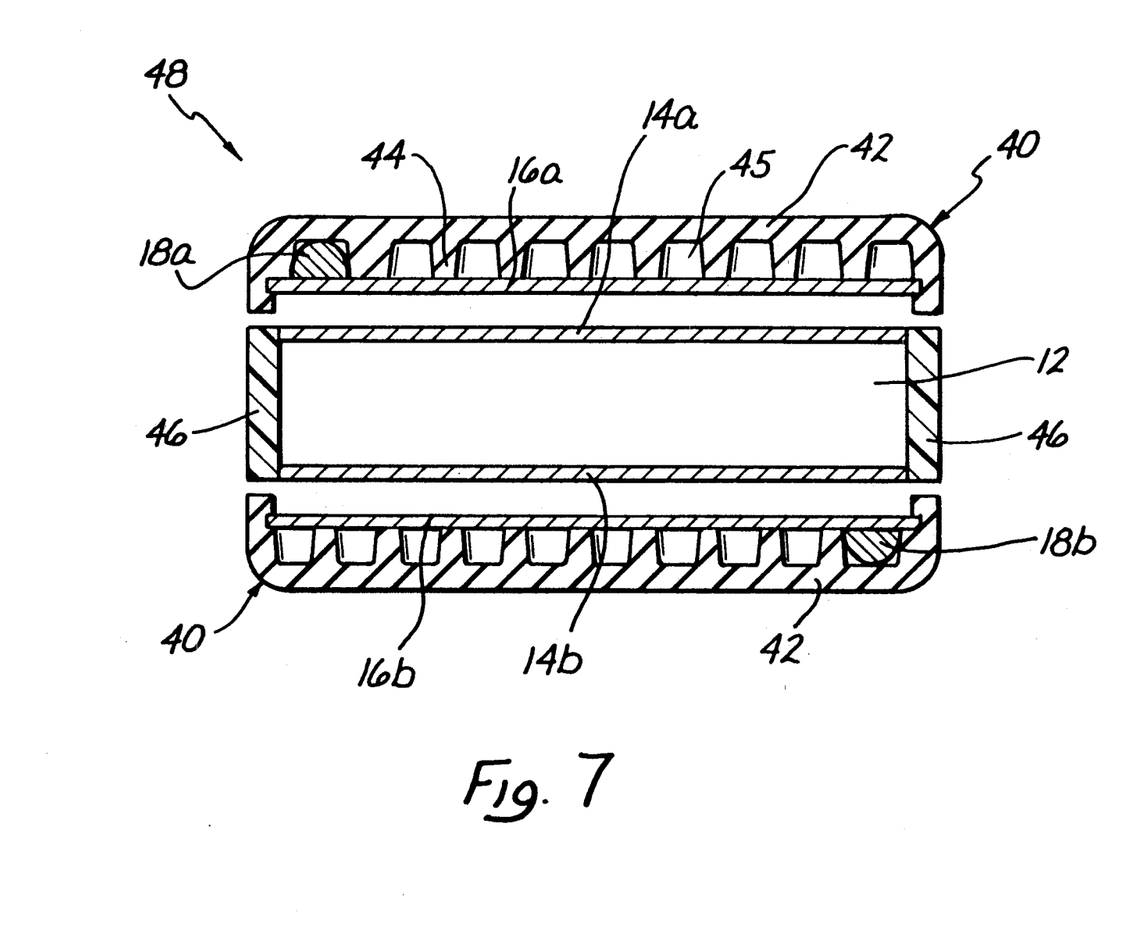
FIG. 7 is an exploded sectional view taken along 7—7 in FIG. 6, illustrating an integrated cover assembly with end-plate stiffening, thermally insulating, current collecting, and current removing features.

FIG. 6 and FIG. 7 illustrate a modular apparatus [48] composed of a pair of integrated cover members [40], each formed of an injection molded plastic cover [42] with integral honeycomb ribs [44] (FIG. 7) for rigidly stiffening the bipolar cell stack [12] (i.e., ribs composed of a honeycomb material such as that described previously for the honeycomb core [21]). Each pair of honeycomb ribs [44] is separated by air space [45] (FIG. 7)

which is preferably filled with insulation foam [30] for thermally insulating the bipolar cell stack [12]. The honeycomb ribs [44] are conveniently spaced to accept a lengthwise dimension of a current removing member [18a], and the injection molded plastic cover has an aperture [24] (FIG. 6) which exposes removal end [26a], thus providing the novel geometry of the present invention. A current collecting end-plate [16a], in parallel electrical contact with the current removing member [18a] and the honeycomb ribs [44], may be part of this integrated cover member [40]. A bipolar cell stack [12] having a positive output end-plate [14a] and a negative output end-plate [14b] is fixably mounted within a battery case [46]. The bipolar cell stack [12] is sandwiched between a pair of the integrated cover members [40] during assembly of the modular apparatus [48]. The integrated cover members [40] communicate with the battery case [46] to provide a sealed, modular apparatus [48].

Figure 8:
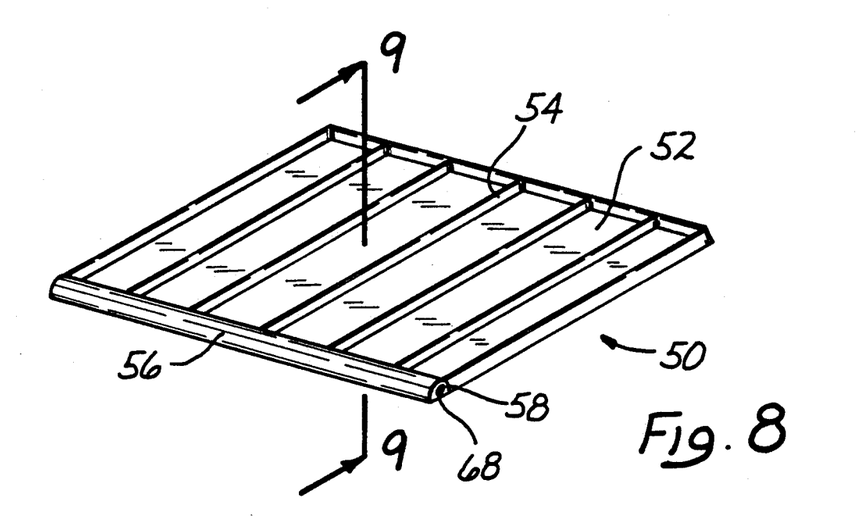
FIG. 8 is a component perspective drawing illustrating an embodiment of an integral current collecting, current removing and stiffening end-plate.
Figure 10:
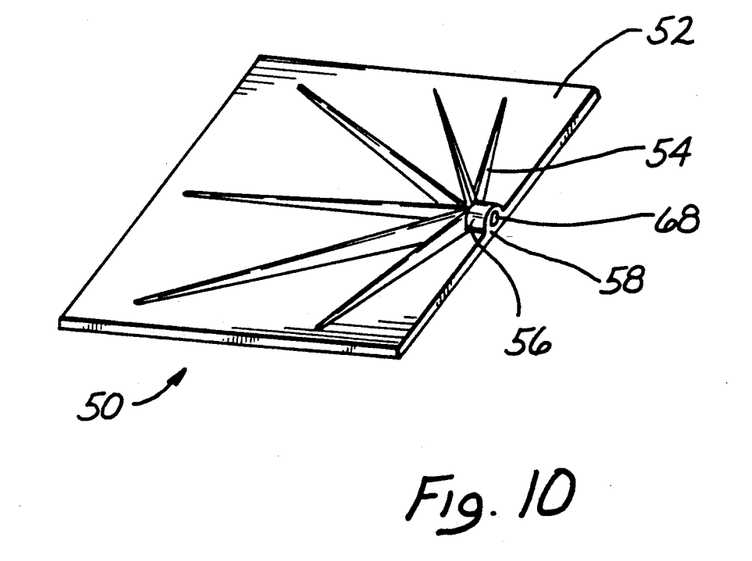
FIG. 10 is a component perspective drawing illustrating another embodiment of an integral current collecting, current removing and stiffening end-plate.

FIG. 8 and FIG. 10 illustrate an integral end-plate member [50] which functionally combines the current collecting, current removing, and stiffening end-plate features of the present invention. The integral end-plate member [50] may be inexpensively die-cast from copper, aluminum, or lead in mass production. The integral end-plate members [50] each have a current collecting plate [52] for communicating with an output end-plate [14a, 14b] of a bipolar cell stack [12] and a plurality of stiffening and current collecting ridges [54] which serve the dual purposes of rigidly stiffening the bipolar cell stack [12] against distortion, while transversely channeling electrical current through structure for removing current [56] to a current removal end [58]. The integrated end-plate member [50] is functionally equivalent to a separately combined current collecting end-plate [16a], current removing member [18a] and rigid end-plate [20].

Figure 9:
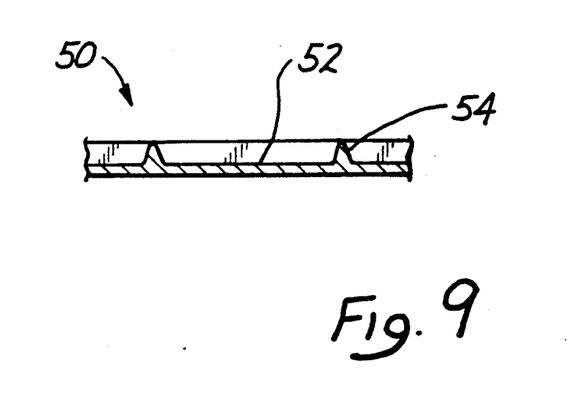
FIG. 9 is a cross-sectional view taken along line 9—9 in FIG. 8.
Figure 11:
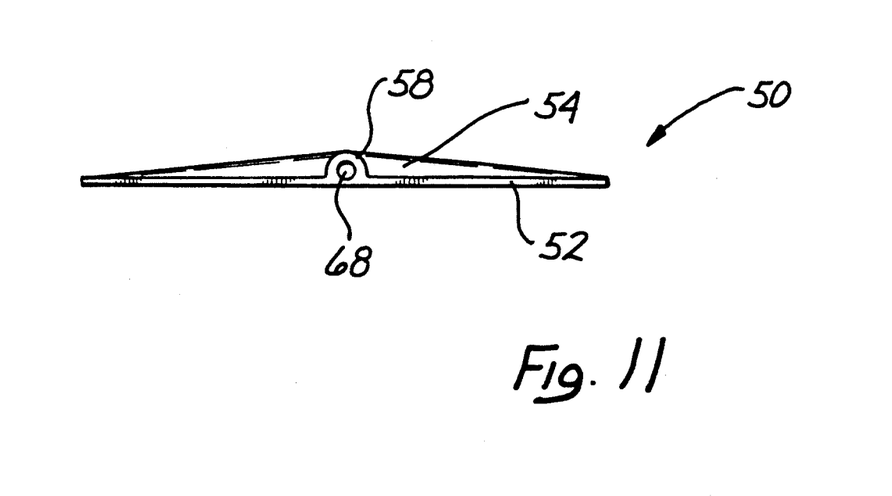
FIG. 11 is an end view of FIG. 10.

Cross-sectional views of two integrated end-plate embodiments are provided in FIG. 9 and FIG. 11. The bipolar cell stack [12] is sandwiched between a pair of integrated end-plates [50]. A thermally insulating end-plate of solid foam or wood having surface features which are complementary to surface features of the integrated end-plates [50] may be disposed in parallel communication with each integrated end-plate member [50] prior to final assembly within a sealed enclosure.

Figure 12A:
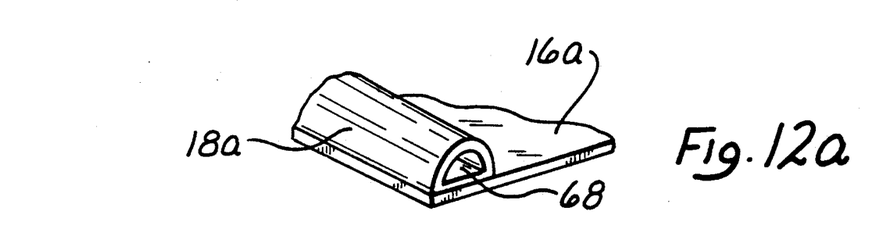
FIGS. 12a-12e are schematic diagram of terminal connections to the apparatus of the present invention.
Figure 12B:
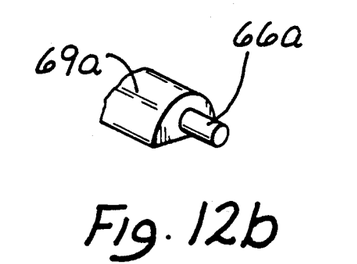
Figure 12C:
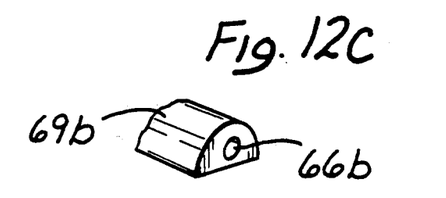
Figure 12D:
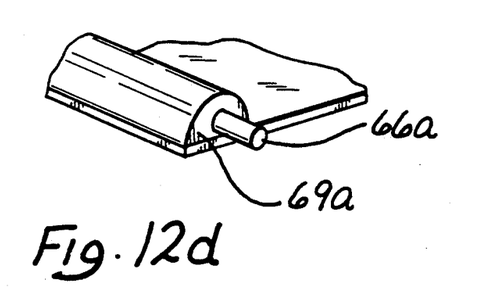
Figure 12E:
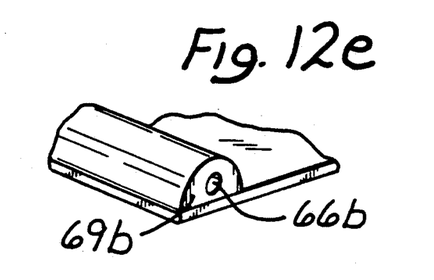

FIGS. 12a-12e illustrate novel terminal connections to the apparatus of the present invention. FIG. 12(a) illustrates a current removing member [18a] having an hollowed receptacle [68] for receiving snug fitting male [66a] or female [66b] solder joints. FIG. 12(b) illustrates a male-terminated plug ]69a] and FIG. 12(c) illustrates a female-terminated plug ]69b], both of which are generally compatible with the hollowed receptacle [68] of current removing member [18a]. FIG. 12(d) illustrates the male-terminated plug [69a] inserted into the hollowed receptacle [68] and FIG. 12(e) illustrates the female-terminated plug ]69b] inserted into the hollowed receptacle [68]. Any external connections made with the male-terminated plug [69a] or the female-terminated plug [69b] are preferably low-resistance solder type connections with an external wire, plug, or bus bar. The male-terminated plug [69a] may have external threads and the female-terminated plug may have internal threads to simplify external connection. In addition, external connections may be made using standard burning processes, with lead for example. These and many other practical features may be implemented without reducing the stackability of the apparatus [10] or the apparatus [48].

Several novel methods for providing parallel electrical communication between conductive elements are practical. These methods preferably require relatively low activation temperatures if heating is required, providing a cost effective and flexible manufacturing implementation. These steps may therefore be performed at any stage prior to or during the assembly of the apparatus of the present invention since low activation temperatures will not damage any lightweight plastic components utilized (such as a sealed enclosure [22], a battery case [46] or an injected molded plastic cover [42]).

The first preferred method for utilizes a foil of low melt-temperature metal alloy, a Tin-Bismuth composition for example (a foil thickness of approximately 0.001 inch is recommended). A layer of low melt-temperature metal alloy foil is sandwiched between a positive ]14a-]output end-plate of a bipolar cell stack [12] and one of a variety of current collecting components previously disclosed. Heating the sandwiched components to a temperature which melts the foil layer and subsequently cooling to room temperature, affects a highly desirable low resistance parallel electrical connection. It is preferable to perform this step prior to final assembly of the bipolar cell stack [12], to reduce the complexity of final assembly of the apparatus. A temperature which is generally 70° Celsius is acceptable for many Tin-Bismuth compositions of low melt-temperature metal alloys. Low melt-temperature metal alloys are readily available under such trade names as Wood's, Lipowitz's, Onion's, Newton's, Rose's, or Cerro metal. Alternatively, the step of sandwiching the foil between conductive end-plate surfaces may be replaced by first pretinning adjoining surfaces of the output end-plates [14a, 14b] and the corresponding current collecting and removing members [34] with a low melt-temperature metal alloy. The novelty of this method is that the heating process may be performed at any time during assembly of the apparatus, since the temperature utilized may be low enough to not damage the preferred plastic enclosure [22] or any other sensitive components of the apparatus. This provides flexibility in the manufacturing process.

A related method sandwiches a layer of conductive epoxy in place of the low melt-temperature metal alloy. Silver epoxy exhibits a low resistivity to current flow and is therefore a good choice. Curing the epoxy, with or without an heating step, effects the desired parallel electrical communication between the output end-plates [14a, 14b] and the current collecting and removing members [34].

Still another related method sandwiches a layer of conductive plastic film having double sided adhesive in place of the low melt-temperature metal alloy. Laminating the sandwiched components together with heat and pressure affects the desired parallel electrical communication between the output end-plates [14a, 14b] and the current collecting and removing members [34].

It is to be understood that numerous substitutions, modifications and alterations are permissible without departing from the spirit and scope of the invention as defined in the following claims.

What is claimed is:

1. An apparatus comprising:
   a rechargeable bipolar means in the form of a cell stack for generating electrical power having a positive output end and a negative output end;

a combined means for collecting and removing current from said rechargeable bipolar means in parallel electrical communication with said positive and said negative output ends;

a rigid means for sandwiching said rechargeable bipolar means in parallel communication with said combined means, a sealed means for enclosing said rechargeable bipolar means, said combined means and said rigid means disposed in parallel communication with said rigid means, said sealed means having apertured means for exposing said combined means to external electrical connection.

2. The apparatus in claim 1 further comprising a non-conductive means for thermally insulating said rechargeable bipolar means disposed in parallel communication with said rigid means.

3. The apparatus in claim 1 wherein a pair of integral end-plate members are stacked in parallel communication with said rechargeable bipolar means at said positive and said negative output ends; said pair of integral end-plate members being integrally composed of said rigid means for sandwiching, and said combined means for collecting and removing current.

4. The apparatus in claim 3 wherein each said integral end-plate member is composed of a current collecting plate having a plurality of stiffening and current collecting ridges in electrical communication with a transverse means for removing current; said transverse means for removing current having a current removal end.

5. The apparatus of claim 4 wherein each said integral end-plate member is die-cast from a metal selected from the group of copper, aluminum, and lead.

6. The apparatus of claim 1 wherein said combined means for collecting and removing current is composed of a first current collecting member in parallel electrical communication with a first current removing member and a second current collecting member in parallel electrical communication with a second current removing member.

7. The apparatus of claim 1 wherein said combined means for collecting and removing current is composed of a first current removing member in parallel electrical communication with said positive output end and a second current removing member in parallel electrical communication with said negative output end.

8. An apparatus comprising:
a rechargeable bipolar means in the form of a cell stack for generating electrical power having a positive output end-plate and a negative output end-plate;

a first current collecting member in parallel electrical contact with said positive output end-plate and a second current collecting member in parallel electrical contact with said negative output end-plate;

a first current removing member in parallel electrical contact with said first current collecting member and a second current removing member in parallel electrical contact with said second current collecting member; said first current removing member having a first removal end and said second current removing member having a second removal end;

a first thermally insulating and stiffening end-plate member in parallel communication with said first current removing member and said first current collecting member;

a second thermally insulating and stiffening end-plate member in parallel communication with second current collecting member and said second current removing member.

a sealed means in communication with said first and said second thermally insulating and stiffening end-plate members for enclosing said rechargeable bipolar means; and said sealed means having a pair of apertured means for exposing said first removal and and said second removal end.

9. The apparatus of claim 8 wherein said first and said second thermally insulating and stiffening end-plate members each have an elongated indentation which accepts a perimetrical profile of said first and said second current removing members.

10. The apparatus of claim 8 wherein said first thermally insulating and stiffening end-plate member and said second thermally insulating and stiffening end-plate member are composed of a non-conductive rigid end-plate having a honeycomb core filled with a dispersion of insulating foam.

11. The apparatus of claim 8 wherein said first and said second current collecting members are composed of a copper base metal.

12. The apparatus of claim 11 wherein a thickness of said copper base metal is generally for 2 to 5 mils.

13. The apparatus of claim 8 wherein said first and said second current removing members are composed of a copper base metal.

14. The apparatus of claim 8 wherein said and said second thermally insulating and stiffening end-plate members are composed of wood.

15. The apparatus of claim 8 wherein said first and said second thermally insulating and stiffening end-plate members are composed of solid foam core.

16. The apparatus of claim 8 wherein a perimetrical profile of said first and said second current removing members is generally circular.

17. The apparatus of claim 8 wherein a perimetrical profile of said first and said second current removing members are generally square.

18. The apparatus of claim 8 wherein a perimetrical profile of said first 18 and said second current removing members are generally U-shaped.

19. The apparatus of claim 8 wherein said first removal end and said second removal end each have a centrally disposed hollowed receptacle.

20. The apparatus of claim 19 wherein said hollowed receptacle receives a male-terminated plug.

21. The apparatus of claim 19 wherein said hollowed receptacle receives a female-terminated plug.

22. A modular apparatus comprising:
a bipolar cell stack having a positive output end-plate and a negative output end-plate; and said bipolar cell stack fixably mounted in a battery case which exposes said positive output end-plate and said negative output end-plate;

a pair of integrated cover members each including an injection molded plastic cover having a plurality of integral honeycomb ribs, a current collecting member in parallel communication with said honeycomb ribs and a current removing member in parallel electrical communication with said current collecting member and disposed within said injection molded plastic cover; and said current removing member having a first removal end; and said injection molded plastic cover having apertured means for exposing said first removal end of said current removing member to external electrical connection and said injection molded plastic cover having a dispersion of thermally insulating foam between said plurality of honeycomb ribs;

said bipolar cell stack rigidly sandwiched between said pair of integrated cover members at said positive and said negative output end-plates; and said pair of integrated cover members communicating with said battery case.

* * * * *